United States Patent [19]

Fox

[11] 4,404,473

[45] Sep. 13, 1983

[54] DIRECT CURRENT POWER CONTROLLER

[75] Inventor: David A. Fox, Shawnee Township, Allen County, Ohio

[73] Assignee: Westinghouse Electric Corp., Pittsburgh, Pa.

[21] Appl. No.: 331,863

[22] Filed: Dec. 17, 1981

[51] Int. Cl.³ .............................................. H02H 9/02
[52] U.S. Cl. ................................... 307/125; 323/274; 361/93; 361/98
[58] Field of Search ............... 307/125, 131, 296, 297; 323/274, 277, 349; 361/18, 88, 91, 98, 93

[56] References Cited

U.S. PATENT DOCUMENTS

| | | | |
|---|---|---|---|
| 3,912,981 | 10/1975 | Tsurushima | 361/98 |
| 4,086,503 | 4/1978 | Fox et al. | 307/363 |
| 4,178,619 | 12/1979 | Seiler et al. | 361/18 |
| 4,227,098 | 10/1980 | Brown et al. | 307/311 |

OTHER PUBLICATIONS

*International Rectifier*, Data Sheet No. PD-9,305c, 11/79.
*Driving VMOS Power FETs*, Siliconix, Application Note AN79-3, Jan. 1979.
*VMOS-A Breakthrough in Power Mosfet Technology*, Siliconex, Application Note AN76-3.

Primary Examiner—Michael L. Gellner
Assistant Examiner—Todd E. De Boer
Attorney, Agent, or Firm—R. P. Lenart

[57] ABSTRACT

A direct current power controller for use in electrical control systems such as aircraft control circuits. The controller utilizes a field effect transistor (FET) as the switching element. A bias voltage supply circuit powers a gate driving circuit, current limiting circuit, and trip indicating circuit. Gate driving circuitry is not directly connected to the system ground, thus minimizing load interference with controller performance and eliminating the need for level shifting circuitry. Remote control circuitry is provided.

16 Claims, 3 Drawing Figures

DIRECT CURRENT POWER CONTROLLER

BACKGROUND AND SUMMARY OF THE INVENTION

This invention relates to electrical power controllers for direct current electrical systems and more particularly to power controllers wherein the switching element is a field effect transistor (FET).

Electrical power controllers for use in direct current circuits which utilize PNP or NPN bipolar transistors as the power switch elements are well known. However, certain characteristics of bipolar power transistors such as relatively low gain, temperature instability, potential second breakdown, and low input impedance, have limited power controller efficiency and added to power controller complexity.

The recent commercial introduction of power field effect transistors has raised the possibility of improvement in power controller efficiency and performance. Power field effect transistors have relatively high gain, good temperature stability, high input impedance, and freedom from second breakdown. The present invention seeks to utilize these FET characteristics to provide a power controller which is more efficient and contains fewer parts than controllers which operate at similar power levels but use bipolar transistors as their primary switching element.

The power controller of this invention comprises a power field effect transistor (FET) which is used as a switch to control current into a load; gate drive circuitry which turns the FET on and off; current limiting circuitry which limits current into the load by forcing the gate drive circuitry to turn the FET off; and a bias voltage supply which raises the gate voltage signal to a level greater than the maximum load voltage. Provisions are also made for remote control of the power controller and for a visible and electrical indication of the on or off (trip) status of the FET.

Since commercially available power FET's are N channel devices, a positive voltage signal measured from gate to source is required to turn them on. When an FET is connected as a switch with its drain connected to a line voltage conductor and its source connected to a load, the voltage across the load will approach line voltage when the FET is turned on. This means that the voltage at the FET source will approach line voltage. Since gate voltage must be positive with respect to source voltage to maintain the on condition of the FET, gate voltage must be supplied from a voltage source which is greater than the maximum load voltage by a specified amount, typically five to twenty volts. A bias voltage source is included in the present invention to fulfill this requirement.

An integrated circuit logic gate is used to provide gate control voltage. This technique could not be used with a bipolar transistor as the switching element but can be used with an FET because of its high input impedance. Power control is provided by a current limiting circuit which senses load current and acts through the gate control circuit to turn the FET off when a preselected current level is exceeded.

The present invention controller utilizes a current limiting circuit and a logic gate driving circuit that are connected to a common bus which is not connected to load ground. This floating control circuit arrangement eliminates the level shifting and amplifying circuits previously required in power controllers which used bipolar transistors as the primary switching element.

DESCRIPTION OF THE PREFERRED EMBODIMENT

Figure 1:
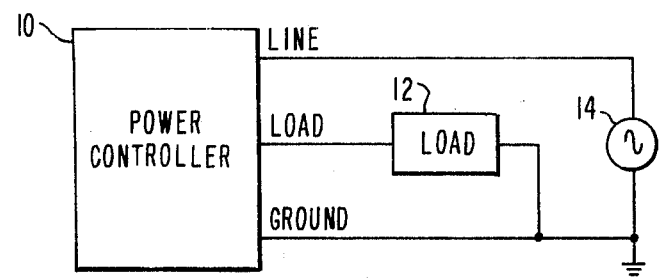
FIG. 1 is a diagram of an exemplary system to which the present invention may be applied.

FIG. 1 shows an example of an electrical system, such as an aircraft control circuit, in which the present invention is advantageously used. A DC generator 14 supplies a voltage to the LINE terminal of power controller 10. A load 12 is connected between the LOAD and GROUND terminals of power controller 10.

Figure 2:
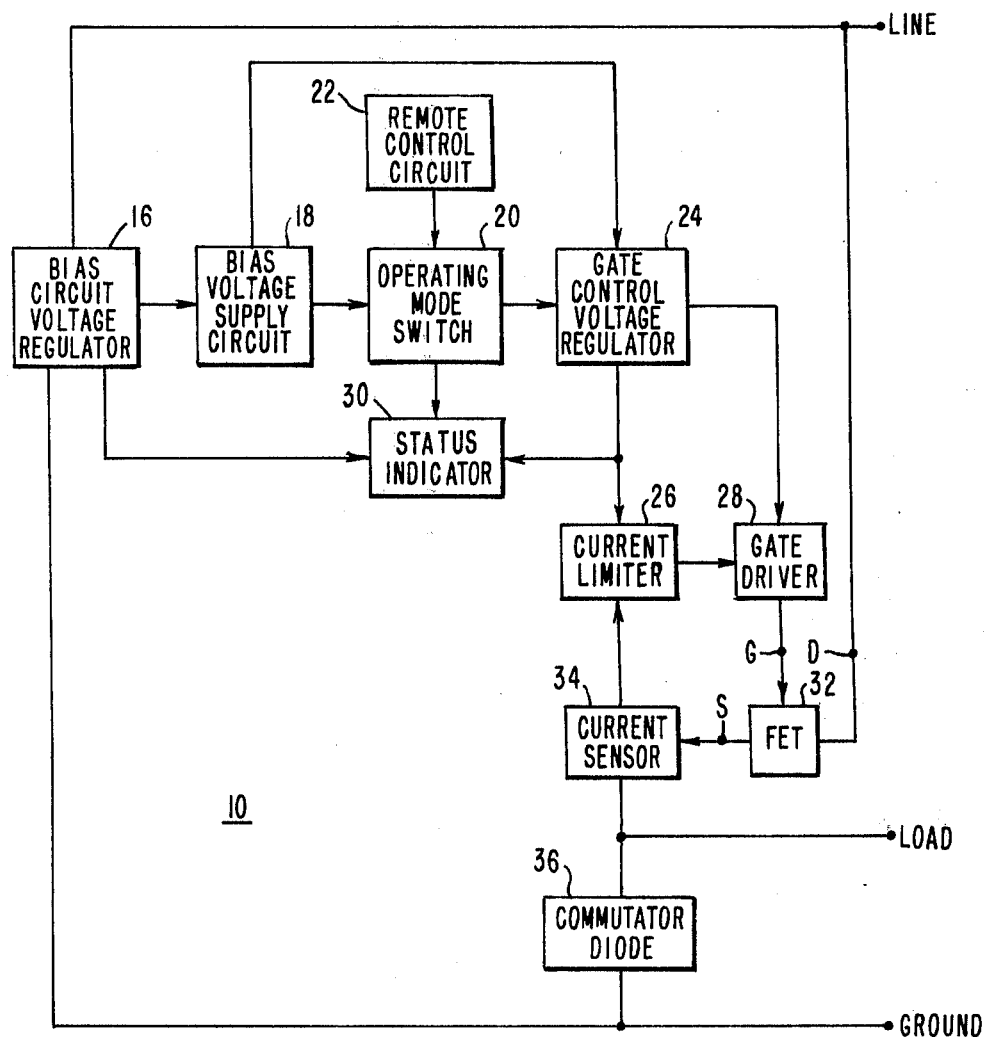
FIG. 2 is a functional block diagram of a direct current power controller in accordance with an embodiment of the present invention.

Referring to the functional block diagram of FIG. 2, line voltage from an external circuit enters the direct current power controller at the LINE terminal. Since commutator diode 36 is normally reverse biased, its leakage current can be assumed to be negligible and all of the current passing through current sensor 34 can be assumed to be delivered to a load in an external circuit which is connected between the power controller LOAD and GROUND terminals.

When FET 32 is turned on, its drain D to source S resistance will be small compared to the load resistance. In addition, current sensor 34 will also have a small resistance. Therefore when FET 32 is on, it should be apparent that the voltage at source S will approach line voltage.

Commercially available power FET's are N channel devices which require that gate voltage be positive with respect to source voltage in order to keep the FET in an on state. Since the voltage at source S can approach line voltage, a bias voltage in excess of line voltage must be available at gate G so that control over FET 32 can be maintained. This bias voltage is supplied by bias voltage supply circuit 18.

Bias circuit voltage regulator 16 provides a regulated voltage between LINE and a floating common which is used to energize bias voltage supply circuit 18 and status indicator 30. Bias voltage supply circuit 18 utilizes known oscillator and voltage doubler circuitry to produce a bias voltage in excess of line voltage.

Operating mode switch 20 is a single pole three position switch with remote, local, and off positions. If set at the off position, bias circuit voltage regulator 16 and bias voltage supply circuit 18 will continue to operate but the remaining controller circuits will be turned off. If set at the remote position, the power controller will operate in response to a signal from a remote control circuit 22. If set at the local position, the power controller will function continuously when an external circuit to be controlled is connected to the LINE, LOAD, and GROUND terminals.

Bias voltage supply circuit 18 output is also supplied to gate control voltage regulator 24. Gate control voltage regulator 24 provides a regulated voltage to gate control circuitry comprising current limiter 26 and gate driver 28. Status indicator 30 monitors the operation of gate control voltage regulator 24, and gives a visible and electrical signal when the current through gate control voltage regulator 24 indicates that FET 32 is turned off.

Gate driver 28 provides a logic level voltage to gate G to turn on FET 32. This logic level voltage is referenced to the load side of current sensor 34. Since current sensor 34 has a small resistance, the voltage drop across it will be small, typically on the order of millivolts, and a logic voltage on gate G will be positive with respect to the voltage at source S.

When current limiter 26 determines that the current through current sensor 34 is in excess of a preselected value, it will send a signal to gate driver 28 which will remove the voltage from gate G, thus turning off FET 32. A pair of NAND gates in gate driver 28 are connected to latch in the trip condition, thus keeping FET 32 off until the circuit is reset by removing the remote control signal or switching the operating mode switch 20 to the off position. Time delay circuits are provided in the gate driver 28 and current limiter 26 to control output rise and fall times, and to provide a desired current-trip time characteristic.

Figure 3:
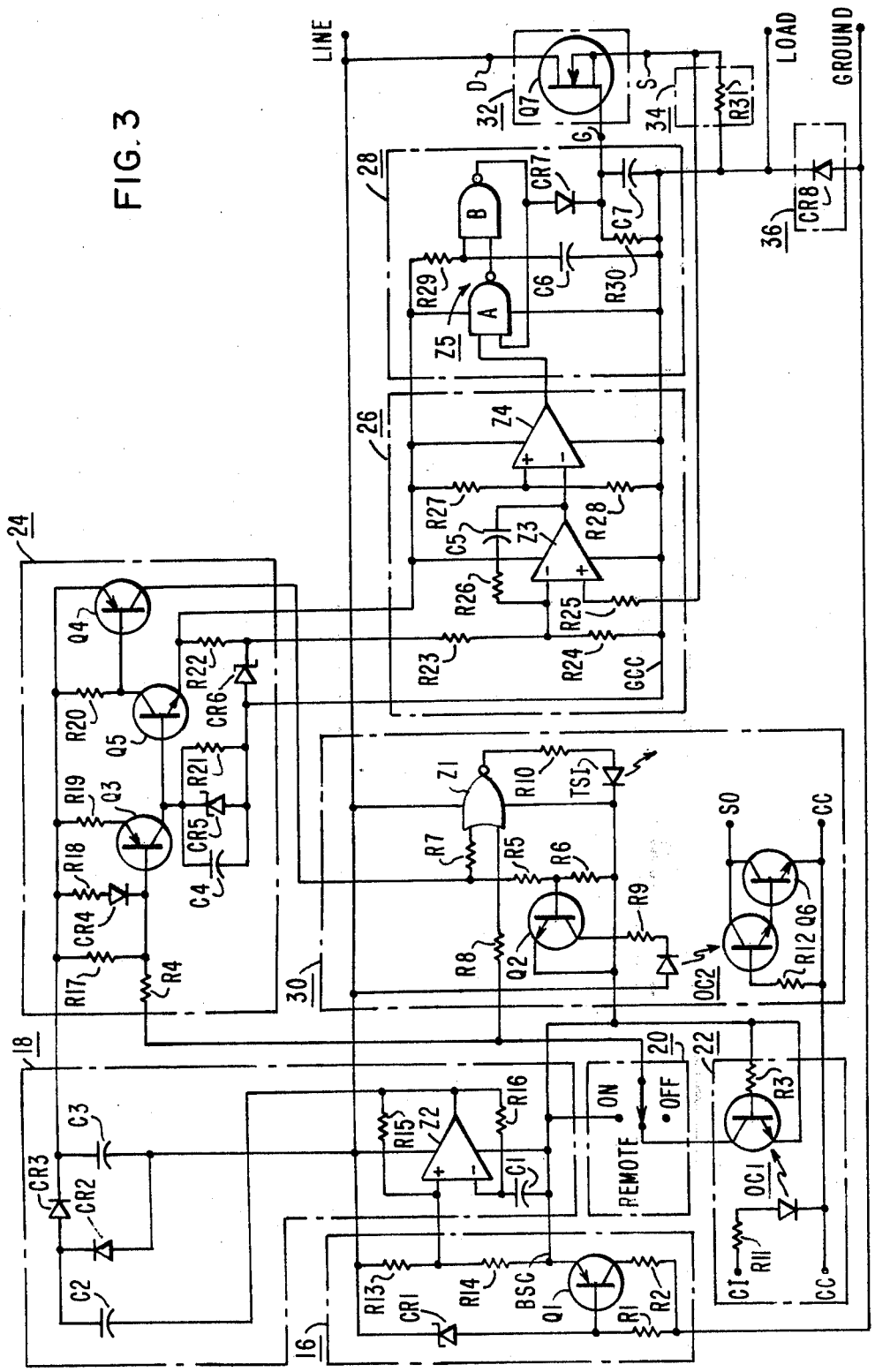
FIG. 3 is a schematic diagram of an embodiment of the present invention.

A specific embodiment of a direct current power controller built in accordance with the present invention is shown in FIG. 3. Switching FET 32 is shown as Q7, current sensor 34 is resistor R31, and commutation diode 36 is diode CR8. Bias circuit voltage regulator 16 comprises: resistors R1, R2, R13, and R14; Zener diode CR1; and transistor Q1. Using Q1 as the regulating element and the Zener reference voltage of CR1, the bias circuit voltage regulator provides a stable voltage between the LINE conductor and the bias supply common BSC. This stable voltage powers bias voltage supply circuit 18 which comprises: operational amplifier Z2; diodes CR2 and CR3; capacitors C1, C2 and C3; and resistors R15 and R16.

The positive input terminal of op-amp Z2 receives a fixed voltage from the connection between resistors R13 and R14 located in bias circuit voltage regulator 16. Capacitor C1 is connected between the negative input of op-amp Z2 and resistors R15 and R16 are connected as positive and negative feedback resistors on op-amp Z2. This configuration causes the output of op-amp Z2 to oscillate. The oscillating signal is connected to a voltage doubler circuit comprising capacitors C2 and C3, and diodes CR2 and CR3. This results in a bias voltage on capacitor C3 in excess of the LINE voltage, which is subsequently used to provide a gate voltage signal to FET Q7.

The bias voltage on capacitor C3 is used by gate control voltage regulator 24 to produce a constant voltage to power the gate control circuit which comprises current limiter 26 and gate driver 28. Gate control voltage regulator 24 comprises: transistors Q3, Q4 and Q5; diodes CR4, CR5 and CR6; resistors R4, R17, R18, R19, R20, R21 and R22; and capacitor C4. Operation of the gate control voltage regulator 24 is controlled by a single pole, three position operating mode switch 20. When this switch is in the off position, resistor R4 is isolated from bias supply common BSC by resistor R8 and NOR gate Z1 so that negligible base current flows in transistor Q3, keeping it in the off state and disabling gate control voltage regulator 24.

When operating mode selector switch 20 is in the local on position, resistor R4 is connected to bias supply common BSC. This allows base current to flow in transistor Q3, turning it on and enabling gate control voltage regulator 24.

When operating mode selector switch 20 is in the remote position, the function of gate control voltage regulator 24 is controlled by remote control circuit 22, comprising optical coupler OC1 and resistors R3 and R11. A positive voltage on control input terminal CI with respect to control common CC will turn on the light emitting diode of optical coupler OC1. This will turn on the phototransistor of optical coupler OC1, thereby connecting resistor R4 to bias supply common BSC and enabling gate control voltage regulator 24.

The function of gate control voltage regulator 24 is monitored by status indicator 30 which provides a visible and electrical trip indication signal when gate control voltage regulator 24 is enabled but not supplying sufficient current to turn on FET Q7. The status indicator comprises: NOR gate Z1, transistors Q2 and Q6, optical coupler OC2, light emitting diode TSI, and resistors R5, R6, R7, R8, R9, R10 and R12.

The visible trip signal indicator, light emitting diode (LED) TSI, will remain off as long as at least one of the inputs to NOR gate Z1 is high with respect to bias supply common BSC. The input to NOR gate Z1 which is connected to resistor R8 will be high when operating mode switch S1 is in the off position or if the switch is in the remote position, when the phototransistor of optical coupler OC1 is off. The input to NOR gate Z1 which is connected to resistor R7 will be high when transistor Q5 is drawing sufficient current through resistor R20 to turn on Q4. Therefore, LED TSI will only be turned on if operating mode switch S1 is in the local position or the remote position when the phototransistor of optical coupler OC1 is turned on and when transistor Q4 is turned off. Resistor R30 in gate driver 28 must be chosen such that when FET Q7 is on, transistor Q5 is drawing enough current to turn on transistor Q4 and when FET Q7 is off, transistor Q5 is not drawing sufficient current to turn on transistor Q4.

The electrical trip indication signal provided by status indicator 30 is the absence of a grounding signal between terminal SO and control common CC when FET Q7 is off. As previously explained resistor R30 has been selected such that when FET Q7 is off, transistor Q5 will not draw enough current to turn on transistor Q4. When transistor Q4 is off, base current will not be available to turn on transistor Q2, therefore transistor Q2 will be turned off and the light emitting diode of optical coupler OC2 will be off, thus maintaining the phototransistor of optical coupler OC2 and transistor Q6 in the off condition. This removes the grounding signal from terminal SO and control common CC. Conversely, if FET Q7 is on, transistors Q4, Q2 and Q6 would be on and the grounding signal would be present at terminal SO and control common CC.

The gate control circuitry, comprising gate driver 28 and current limiter 26 becomes functional when gate control voltage regulator 24 is enabled. Gate driver 28 which comprises: NAND gates Z5A and Z5B, capacitors C6 and C7, resistors R29 and R30, and diode CR7; receives power from gate control voltage regulator 24. When gate driver power is initially turned on, a circuit branch comprising R29 and C6 provides a momentary low input to NAND gate Z5B thereby driving its output high and turning on FET Q7 through diode CR7.

Initial turn on time of FET Q7 is controlled by the charging rate of capacitor C4 in gate control voltage regulator 24. Turn off time of FET Q7 is controlled by the discharge of capacitor C7 through resistor R30 in gate driver 28.

Diode CR6 in gate control voltage regulator 24 provides a reference voltage to current limiter 26 which serves as the basis for comparison with a voltage developed across current sensing resistor R31. Current limiter 26 comprises: resistors R23, R24, R25, R26, R27 and R28, capacitor C5, and operational amplifiers Z3 and Z4. When sensing resistor voltage reaches a threshold value, an inverse time delay is caused by the current limiter circuit such that the output of op-omp Z4 goes low at the end of the time delay. This causes the output of NAND gate Z5A to go high and the output of NAND gate Z5B to go low, turning off FET Q7. This places a limit on the current which can be supplied to the load. Commutation diode CR8 provides a current path for the transient current created by the switching action of FET Q7, thereby preventing voltage spike interference with the remaining controller circuitry. Additional immunity from load generated voltage spikes is provided by the fact that bias supply common BSC and gate control common GCC are not directly connected to the load ground conductor. This floating control circuit arrangement eliminates the need for level shifting circuitry which is necessary in direct current power controllers which use a bipolar transistor as the primary switching element.

The following table of components is provided as a more complete exemplary embodiment of the invention in connection with the circuitry illustrated in FIG. 3.

TABLE OF COMPONENTS

| Integrated Circuits | |
|---|---|
| Z1 | MC14001 |
| Z2 | CA3130 |
| Z3 | CA3160 |
| Z4 | CA3130 |
| Z5 | MC14011 |

| Resistors | |
|---|---|
| R1 | 51K |
| R2 | 3.9K |
| R3 | 47K |
| R4 | 100K |
| R5 | 100K |
| R6 | 47K |
| R7 | 1Meg |
| R8 | 1Meg |
| R9 | 1K |
| R10 | 1K |
| R11 | 1K |
| R12 | 47K |
| R13 | 100K |
| R14 | 100K |
| R15 | 270K |
| R16 | 1Meg |
| R17 | 100K |
| R18 | 10K |
| R19 | 8.2K |
| R20 | 20K |
| R21 | 75K |
| R22 | 82K |
| R23 | 120K |
| R24 | 6.2K |
| R25 | 100K |
| R26 | 200K |
| R27 | 1Meg |
| R28 | 1Meg |
| R29 | 1Meg |
| R30 | 2K |
| R31 | 50 mv shunt |

| Capacitors | |
|---|---|
| C1 | 200pf |
| C2 | 0.1 μf |
| C3 | 10 μf |
| C4 | 0.1 μf |
| C5 | 0.1 μf |
| C6 | .01 μf |

TABLE OF COMPONENTS-continued

| | |
|---|---|
| C7 | 1 μf |

| Diodes | |
|---|---|
| CR1 | 12V Zener |
| CR2 | 1N486B |
| CR3 | 1N486B |
| CR4 | 1N486B |
| CR5 | 10V Zener |
| CR6 | 1.22V Zener |
| CR7 | 1N486B |
| CR8 | 1N1202 |

| Transistors | |
|---|---|
| Q1 | 2N2904A |
| Q2 | 2N2219A |
| Q3 | 2N2904A |
| Q4 | 2N2904A |
| Q5 | 2N2219A |
| Q6 | 2N2219A |
| Q7 | 1RF150 |

| Optical Couplers | |
|---|---|
| OC1 | MCT2 |
| OC2 | MCT2 |

| Light Emitting Diode | |
|---|---|
| TSI | 1N5765 |

While a preferred embodiment of this invention has been described, the specific circuitry employed may be varied in relation to particular applications without departing from the scope of the invention.

What is claimed is:

1. A direct current power controller comprising:
 a power field effect transistor (FET) with source, drain, and gate terminals wherein said drain terminal is connected to a line power terminal for connection to a circuit to be controlled;
 current sensing means connected between said FET source terminal and a load terminal for connection to a circuit to be controlled;
 a ground terminal for connection to a circuit to be controlled;
 means for establishing a bias voltage which is greater than a voltage supplied to said line terminal by a circuit to be controlled, where said line voltage and said bias voltage are both measured with reference to said ground terminal;
 means for turning on said FET by applying a voltage to said gate terminal wherein said means for turning on said FET is referenced to a common bus which is connected to said load terminal; and
 current limiting means responsive to a voltage across said current sensing means for turning off said FET by removing voltage from said gate terminal, wherein said current limiting means is referenced to said common bus.

2. A direct current power controller as recited in claim 1, further comprising:
 means for indicating when said FET is turned off.

3. A direct current power controller as recited in claim 1, further comprising:
 remote control means for enabling said means for turning on said FET and said current limiting means for turning off said FET, in response to a voltage signal from an external circuit.

4. A direct current power controller as recited in claim 1, further comprising:
 means for commutating inductive loads connected between said load terminal and said ground terminal.

5. A direct current power controller as recited in claim 4, wherein said means for commutating inductive loads is a diode with cathode connected to said load terminal and anode connected to said ground terminal.

6. A direct current power controller as recited in claim 1, wherein said current sensing means is a resistor.

7. A direct current power controller as recited in claim 2, wherein said indicating means comprises:
a light emitting diode for producing a visible indication that said FET is turned off; and
a transistor switch which is connected between a signal output terminal and a signal ground terminal and is turned on when said FET is on.

8. A direct current power controller as recited in claim 3, wherein said remote control means comprises:
a branch circuit connected between a control input terminal and a control common terminal;
said branch circuit comprising the series connection of a resistor and a light emitting diode; and
a switching transistor responsive to said light emitting diode.

9. A direct current control system comprising:
a direct current load;
a source of direct current;
a ground conductor connected to said load and said source of direct current;
a direct current power controller comprising a power field effect transistor (FET) with source, drain and gate terminals wherein said drain is connected to said source of direct current;
current sensing means connected between said FET source terminal and a load terminal which is connected to said direct current load;
a ground terminal connected to said ground conductor;
means for establishing a bias voltage which is greater than a line voltage supplied by said source of direct current to said FET drain terminal, where said line voltage and said bias voltage are both measured with reference to said ground terminal;
means for turning on said FET by applying a voltage to said gate terminal, wherein said means for turning on said FET is referenced to a common bus which is connected to said load terminal; and
current limiting means responsive to a voltage across said current sensing means for turning off said FET by removing voltage from said gate terminal, wherein said current limiting means is referenced to said common bus.

10. A direct current control system as recited in claim 9, wherein said power controller further comprises:
means for indicating when said FET is turned off.

11. A direct current control system is recited in claim 9, wherein said power controller further comprises:
remote control means for enabling said means for turning on said FET and said current limiting means for turning off said FET, in response to a voltage signal from an external circuit.

12. A direct current control system as recited in claim 9, wherein said power controller further comprises:
means for commutating the inductance of said load.

13. A direct current control system as recited in claim 12, wherein said means for commutating the inductance of said load is a diode with cathode connected to said load terminal and anode connected to said ground terminal.

14. A direct current control system as recited in claim 9, wherein said current sensing means is a resistor.

15. A direct current control system as recited in claim 10, wherein said indicating means comprises:
a light emitting diode for producing a visible indication that said FET is turned off; and
a transistor switch which is connected between a signal output terminal and a signal ground terminal and is turned on when said FET is on.

16. A direct current control system as recited in claim 11, wherein said remote control means comprises:
a branch circuit connected between a control input terminal and a control common terminal;
said branch circuit comprising the series connection of a resistor and a light emitting diode; and
a switching transistor responsive to said light emitting diode.

* * * * *